US005111215A

United States Patent [19]

Taguchi et al.

[11] Patent Number: 5,111,215

[45] Date of Patent: May 5, 1992

[54] RESISTIVE SHEET TRANSFER PRINTING AND ELECTRODE HEADS

[75] Inventors: Nobuyoshi Taguchi, Ikoma; Fukui Yasuo, Kadoma; Imai Akihiro, Ikoma, all of Japan

[73] Assignee: Matsushita Electric Industrial Co., Ltd., Osaka, Japan

[21] Appl. No.: 623,364

[22] Filed: Dec. 6, 1990

[30] Foreign Application Priority Data

Dec. 7, 1989 [JP] Japan ........................ 1-318064
Dec. 7, 1989 [JP] Japan ........................ 1-318065

[51] Int. Cl.[5] ........ B41J 2/395; G01D 15/06
[52] U.S. Cl. ........ 346/76 PH
[58] Field of Search ........ 346/76 PH, 139 C; 400/120

[56] References Cited

U.S. PATENT DOCUMENTS 4,684,960 8/1987 Nishiwaki ........ 346/76 PH
4,983,992 1/1991 Nakazawa ........ 346/76 PH

*Primary Examiner*—Benjamin R. Fuller
*Assistant Examiner*—Huan Tran
*Attorney, Agent, or Firm*—Wenderoth, Lind & Ponack

[57] ABSTRACT

The present invention relates to a method of resistive sheet transfer recording using a recording member and an electrode head comprising oppositely aligned electrode pair trains embedded in the insulating support member and also relates to an electrode head use therefor, wherein abrasive wear of the electrode pair by sliding contact of the recording member is optimized in a manner that the resistive sheet usually contacts to a fresh surface of the electrode pair train.

The present invention make it possible to give a high quality image with high recording speed and high sensitivity.

28 Claims, 4 Drawing Sheets

RESISTIVE SHEET TRANSFER PRINTING AND ELECTRODE HEADS

BACKGROUND OF THE INVENTION

1. Field of the invention

The present invention relates to a method of resistive sheet transfer printing and an electrode head used in the field of image-forming technique for producing a high quality image with high speed and high sensitivity.

2. Description of the prior art

A high-speed production of a full-color image is suitably realized by a resistive sheet color transfer printing technology by means of current-carrying using a recording member (including an ink sheet made of a resistive sheet carrying thereon an ink containing a pigment or sublimable dye and an image receiving member having a color development layer in the surface thereof) and an electrode head. The electrode head has a multistylus thereof held by a plurality of insulating support members generally made of a thermo-setting resin, glaze or ceramics such as alumina. The same materials is used for both inside and outside of electrode pairs.

In a case where a binary recording image at a high speed is realized by using a sublimable dye as the color materials in order to produce a full color and high quality image, a conventional electrode head poses the following problems to be solved owing to the requirement of a high recording energy:

The insulating support members for the heads can not be optimaized in a thermo-mechanical characteristics;

Realization of high recording speed and sensitivity can not be fully accomplished;

Recording dots is not optimized and stable transit of continuous recording is not fully and practically realized. Especially, under a high speed recording, that is, under a high temperature and pressure, wearability of the insulating support member for the head on which surface the resistive sheet of the recording member is sliding, has not been controlled, so that there is a big problem that contact failure between the multistylus head pairs and the resistive sheet occurs, there by making it difficult to subject the resistive sheet to continuous record running and causing a image an inferior quality. Furthermore, the thermal constant of the insulating support member has not been controlled, so that for instance if the insulating support member having a small thermal diffusion coefficient is used for the head, sensitivity would be improved but the recorded image color would become less clear and the resolution thereof would be reduced due to heat storage. On the contrary, if the insulating support member having a large thermal diffusion coefficient is used, sensitivity would be lowered and also the feature of resistive sheet transfer printing would be lost.

SUMMARY OF THE INVENTION

An object of the present invention is to solve the above-mentioned problems of the conventional systems.

Another object of the present invention is to provide a method of resistive sheet transfer printing and electrode heads for producing a high-quality image with high speed and high sensitivity by use of the resistive sheet in contact with the electrode heads.

According to one aspect of the present invention, there is provided a method of resistive sheet transfer printing by use of an electrode head comprising opposited electrode pairs embeded in insulating support members and a recording member, wherein abrasive wear of the insulating support member inside the electrode pairs due to sliding movement of the recording member is equal to or smaller than that of the insulating support member outside electrode pairs on recording member insertion side and equal to or larger than that of the insulating support member outside electrode pairs on recording member exit or feed-out side.

According to one aspect of the present invention, there is provided a method of resistive sheet transfer printing by use of an electrode head comprising opposited electrode pairs embeded in insulating support members and a recording member, wherein the insulating support member supporting or abutting the electrode pairs is made of glass materials and on recording member exit side, there is formed a support member material which has a large thermal diffusion coefficient than that of glass material.

According to the present invention, the following features are realized:

(1) A high-speed, high-sensitivity and full-color recording at the recording speed of 2 ms per line and recording energy of 2 $J/cm^2$ can be realized.

(2) Large homogeneous recording dots can be produced.

(3) A produced image becomes clear and sharp.

(4) The relative speed ratio of $n=10$ can be obtained under the aforementioned recording condition.

(5) No inferior quality image and no electrode corrosion is observed even after long continuous recording.

BRIEF DESCRIPTION OF THE DRAWINGS

The foregoing and other objects, features and advantages of the invention will be made clearer from description of preferred embodiments referring to attached drawings in which.

DETAILED DESCRIPTION OF THE INVENTION

Figure 1:
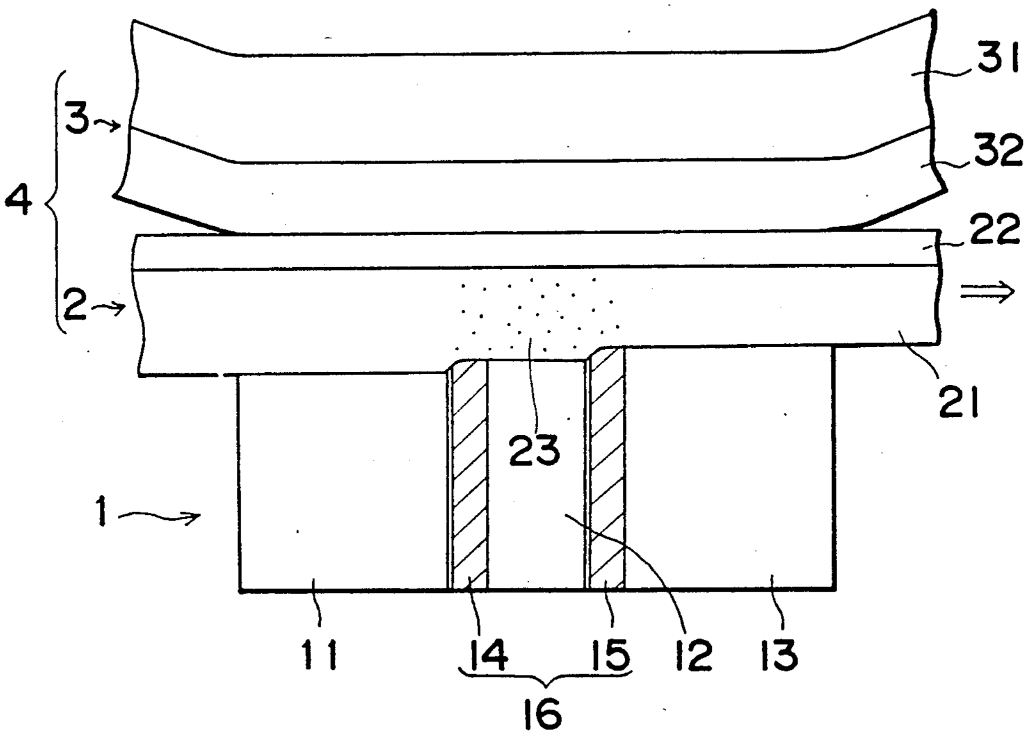
FIG. 1 is a sectional view of a configuration according to a first embodiment of the present invention.

When a signal current is applied to electrode pairs, Joule heat is generated in a corresponding resistive sheet and dyes are transferred to an image-receiving member and recorded. In an insulating support member on a recording member insertion side in a relation to an electrode pair train, abrasive wear thereof by sliding contact of the recording member is equal to or larger than that of the insulating support member on a rear side of the electrode pair train, thereby the resistive sheet usually contacting to a fresh surface of the electrode pair train. In the case of two electrode pair trains, function is similar to the above single train case. On the other hand, the thermal diffusion coefficient of the insulating support member parts on electrode pairs inside and the recording member insertion side are small, so that heat occurred on a recording sheet is efficiently utilized to transfer dyes and thus make it possible for the resistive sheet to be recorded with high sensitivity. At this time, extra heat storage of the heat source in the vicinity of the resistive sheet is transferred to and dissipated in the insulating support member having a large thermal diffusion coefficient on the resistive sheet exit side by means of the resistive sheet running, so that a high quality image not affected by the heat storage can be produced. This phenomenon has a great effect especially on the high-speed recording operation.

Same effect is accomplished when sectional area of the electrode on the anode side is made to be bigger. At the same time, such bigger sectional area of the electrode improves corrosion resistance of the electrode.

The aforementioned functions and effects make it possible to give a stable continuous recording with high speed high sensitivity.

The aforementioned objects may be realized also by a configuration that will be described. That is to say, if the insulating support member supporting or abutting the electrode pairs is made of glass-type materials having a same wearing characteristics, abrasive wear of the support member parts in the vicinity of the electrode pairs due to sliding contact of the recording member are almost same and therefore electrode pairs train always has a stable contact with the resistive sheet to permit a high continuous record running. Also, because of a glass material small in thermal diffusion coefficient, a heat generated on the resistive sheet is effectively utilized for dye transfer thereby to permit a high sensitive recording.

Furthermore, the thickness of the glass support member contacting the electrode pair on the recording member exit side and existing on the recording member exit side is 100 microns or less and this support member contacts to a support having a large thermal diffusion coefficient, so that through this member, extra heat storage of the resistive sheet is dissipated thereby to permit a good heat-controlled and high-quality image. As a result, the aforementioned effects permit a stable continuous recording with high speed and high sensitivity.

A specific configuration of the present invention will be explained with reference to a first embodiment.

Reference numeral 1 designates an electrode head, numeral 2 an ink sheet, numeral 3 an image receiving member, and numeral 4 a recording member including the ink sheet 2 and the image receiving member 3. A running direction of the ink sheet is indicated by arrow in each figure.

The ink sheet 2 is made of a resistive sheet 21 carrying thereon a color material layer 22, and the resistive sheet 21 is made of a resistive film formed by mixing a heat-resistant resin with conductive particles of carbon or the like. This heat-resistive resin is made up of a film-formable resin such as polyimide, alamide, polycarbonate, polyester, polyphenyl sulfide, polyether ketone or the like. This resistive film is formed into the thickness of about 4 to 15 microns and the surface resistance of about 1 K-ohms.

The color material layer 22 is composed of at least a sublimable dye and a binding resin.

The image receiving member 3 is formed of a base paper 31 carrying thereon a color development layer 32. The electrode head 1 is composed of an electrode pair train 16 ( while 14 and 15 each designates an electrode track on the recording member insertion and exit side) embeded in an insulating support member 11, 12 and 13 into a line head. The electrode is made up of a metal or metals selected from the group comprising copper, phosphor bronze, tungsten, titanium, brass, chromium, nichrome or the like. The resolution of the electrode is 6 to 16 dots/mm. One of electrode pair tracks is a common electrode, so that it may be a one continuous body but not necessarily take a divided style.

The insulating support member may be made of a ceramic material having small friction coefficient and large wearing properties. In this case, it is important that abrasive wear of the support member 12 inside the electrode pair train, caused by sliding contact of the recording member 2, is equal to or smaller than that of the support member on the recording member insertion side and also equal to or larger than that of the recording member exit side. The electrode thus produced on the basis of the above design aspects make the surface of the head always keep in the condition of FIGS. 1 to 5 and thus make the electrode pair train 16 be in a stable contact on a rear face of the resistive sheet 21, thereby to permit a stable and continuous record running and thus prevent a recorded image from being deteriorated. If the above aspect is not keeping, that is, the support member 12 is worn out in a larger amount than the support member 11, the surface level of the electrode train 14 is lowered below the surface level of the support member 11 thereby to cause contact failure on a running resistive sheet 21. If the support member 13 tends to wear out in a larger amount than the support member 12, contact failure would also occur between the electrode train 15 and the resistive sheet 21.

As explained on the aspect of the thermal constant, it is important to make thermal diffusion coefficient A of the insulating support member 11 (on the recording member insertion side and the insulating support member) smaller than that of the support member 12 on the recording member exit side. The thermal diffusion coefficient $A=k/dc$ (k: Heat conductivity, d: Density, c: Specific heat) of the latter support member 13 has a value of $1*10^{-6}$ or more, preferably $5*10^{-6}$ or more with $m^2/s$ as a unit while A of the former support members 11 and 12 has a value of $5*10^{-6}$ or less, preferably $1*10^{-6}$ or less. As such a material of the insulating member 11 and 12, there may be selected from various glazes, mica glass, glass ceramics, crystallized glass and also high hard minerals such as kaorin and talc or the like. In a case where the support members 11 and 12 are made of, for example, mica glass, it is necessary to take a variation of a glass components in order to give a hardness difference between them. In the case of the insulating member 13, there is used a material selected from the group comprising BN, BN-type ceramics ( for example, BN-SiN, BN-$Al_2O_3$), AlN, AlN-type ceramics ( for example, AlN-BN-type composite materials), alumina, glass ceramics having a small amount of glass component, solid lublicant having a high electric resistance, or the like.

Figure 2:
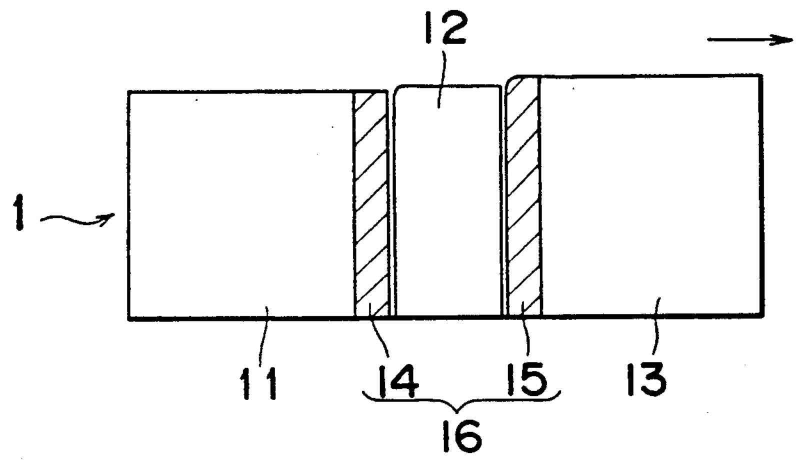
FIGS. 2 to 5 are sectional views of another electrode heads used in the first embodiment of the present invention.
Figure 3:
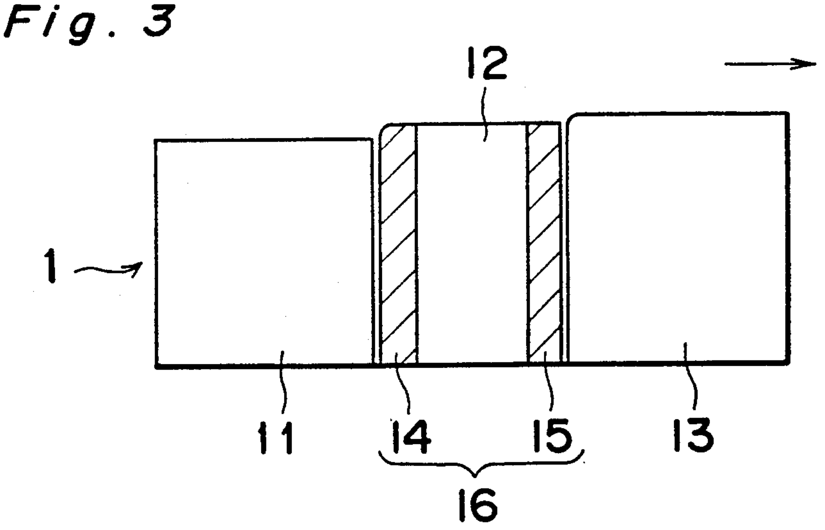
Figure 4:
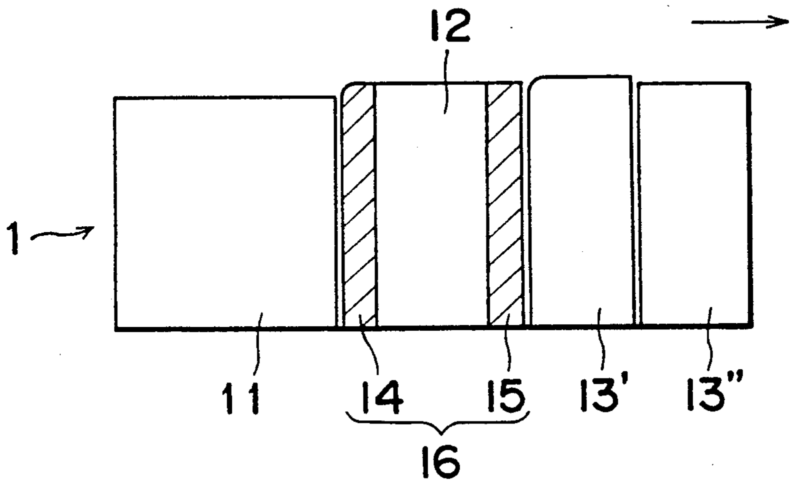
Figure 5:
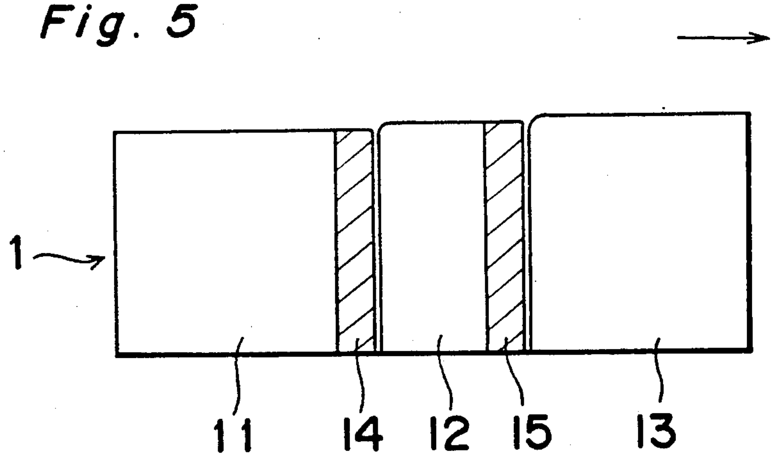

The electrode head shown in FIG. 1 is generally fabricated by a method in which the electrodes 14 and 15 are formed in a pattern on the insulating support members 12 and 13 and followed by holding the insulating support member 11 held therebetween as a spacer and fixing by an inorganic adhesive. The head thus made is polished with a series of polishing paper No. 1000 to 8000 at the surface thereof to give a surface condition used in the Examples. The head shown in FIG. 2 is constructed by laminating the electrode train 14 formed on the support 12 on the electrode train 15 formed on the support 13. The head shown in FIG. 3 is constructed by forming the electrode trains 14 and 15 on both surface of the support member 12. In FIG. 4, the support member 13 constructed as in FIG. 3 is divided into two parts; a more hard one 13' on the recording member insertion side and a less hard one 13" on the recording member exit side, for example, the part 13' may be composed of an almina film with a thickness of about 0.1 mm and the part 13" may be composed of BN or the like as a radiator.

Now, a method of driving the assembly will be described.

A signal current applied between the electrodes 14 and 15 flows through the resistive layer in the direction parallel to the film thereof. Numeral 23 designates a heat-generating section. The recording conditions attained in the process include a pluse width of 1 ms applied to each dot, a recording period of 4 ms per line and a peak temperature of the heat-generating section of 300° C. to 400° C. According to the present invention, the heat storage in the resistive sheet is balanced with the heat release from the head and the stable contact between the electrodes and the resistive sheet is attained, thereby producing a high-sensitivity, high-quality image. The ink sheet 2 and the image-receiving member 3 run between the platen and head under this high temperature and a high pressure (5 kg/100 cm). In order to assure effective utilization of the sheet as required, relative-speed recording is effected between the image-receiving paper and the ink sheet. It is experimentally found that in order to permit smooth running and recording between the head and the sheet, the friction coefficient of 0.3 or less is required at room temperature. In order to promote this condition, the head may be constructed in such a way that the unguent oozes out of the head surface or out of the resistive sheet at high temperatures.

In the case of a movable serial head, an insulating support member corresponding to the member 13 may be considered as a part positioned rearward of the head along the direction of feed thereof.

More specific examples will be explained.

(1) Electrode head: A6-size line head 8 dots/mm in resolution (having a stylus electrode of Cr-Ni), configured of a mica-glass support member 110 outside of the electrode pairs on the recording member insertion side, a mica-glass support member 120 inside of the electrode pairs (which materials have different hardness) and an insulating support member 130 made of BN-AlN composite on the recording member exit or feed-out side. The applied pulse width of 1 ms, the recording period of 2 ms/line and the pressure of 5 kg/100 mm. Both uniform-speed and relative-speed recordings are possible. (Relative speed ratio n = 1 to 10)

Two types of heads have been test produced: One with the electrodes of all the electrode pairs having the same sectional area and the other with the anode electrode train on the recording member exit or feed-out side twice as large as that on the recording member insertion side.

(2) Resistive sheet: The alamide resin is mixed with carbon and is formed into a film having a thickness of 10 microns and a surface resistance of 1 K-ohms.

(3) Color material layer: Composed of solids including, by weight, one part of Indoaniline sublimable dye of cyane and one part of polycarbonate resin, formed into a film having a thickness of 2 microns.

(4) Image-receiving member: Composed of solids including, by weight, one part of polyester resin and 0.2 parts of silica, formed into a thickness of 8 microns on a 100-micron milky PET film.

A recording test conducted under the aforementioned conditions shows that an image is produced by a relative-speed process at a recording cycle of 2 ms/line and a recording energy of 2 $J/cm^2$ to be free of fog and to obtain a long recording distance with a smooth gradation recording characteristic. The image thus recorded has a quality equivalent to the one obtained in the dye transfer recording process using a thermal head as a recording means. Also, an A6-size full-color image can be produced within about five seconds by use of magenta and yellow in addition to the above-mentioned dye. The electrodes having a larger area on supply side are not corroded.

Now, a second embodiment will be explained.

The electrode head 1 is composed of an oppositely-aligned electrode train 16 ( numerals 14 and 15 each designates electrode tracks on the recording member insertion or exit side) embeded in an insulating support member 11', 12' and 13' and is formed into a line head. The electrode is made up of a metal or metals selected from the group comprising copper, phosphor bronze, tungsten, titanium, brass, chromium, nichrome or the like. The resolution of the electrode is 6 to 16 dots/mm. One of electrode trains is formed of common electrodes, so that it is not necessarily take a divided style but may be constructed in an undivided continuous line.

The insulating support member may be made of a ceramic or glass material having a smaller friction coefficient and larger wearing properties. In this case, a glass material designated by numeral 17' has a thickness of 100 microns or less, preferably 30 microns or less and is arranged to contact a support member 18 having a larger thermal diffusion coefficient. The reason why the thickness of the layer 17' is made to be 100 microns or less is that it is preferable that the length of a resistive sheet heated when recorded is smaller than a feeding length during a recording unit time. The heated resistive sheet is cooled by the support member.

The glass material is independently or compositely formed of various glazes, mica glass, glass ceramics, crystallized glass or the like. Mica glass, in particular, has apparently contradictory superior properties including high wear resistance and low friction coefficient, in addition to a small thermal diffusion coefficient as glass inherent property. Mica glass may be prepared by controlling the composition of the fluorine mica contained in glass matrix of $B_2O_3$-$Al_2O_3$-$SiO_2$ or the like. (Marketed in the brand name of Macole by Corning Inc.)

The material of the support member 18 includes BN or BN-ceramics composite (such as BN—SiN or BN—$Al_2O_3$), AlN or AlN-ceramics composite (such as AlN-BN composite material), alumina, glass-ceramics small in glass content, a solid lubricant, metal or the like.

The support member may be constructed by forming two separated bodies; one made of a glass material of smaller thermal diffusion coefficient and the other made of a ceramics material having a larger thermal diffusion coefficient and then combining them into a one body. It may be formed as an integral body by means of enamel coating. Further, as designated by the numeral 20, it may be a integral one comprising electrodes 15, 17' and 18 on the recording member exit side by means of combination of an enamel coating and printing techniques. As a base material of the enamel coating, there are used various steel plates and Al materials. As the enamel coating materials (glass layer), it is preferred to use the above mentioned mica glass or the like.

The thermal diffusion coefficient A=k/dc (k: Heat conductivity, d: Density, c: Specific heat) of the support member 18 has a value of $1*10^{-6}$ or more, preferably $5*10^{-6}$ or more with $m^2/s$ as a unit while A of the support members 11', 12' and 17' has a value of $5*10^{-6}$ or less, preferably $1*10^{-6}$ or less.

Figure 6:
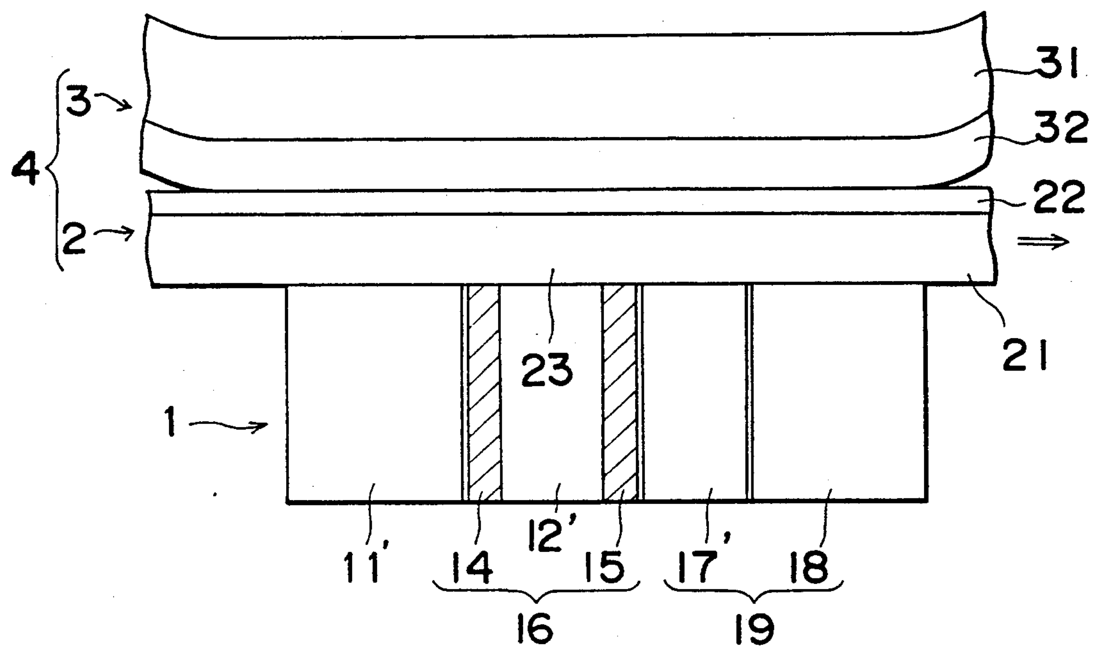
FIG. 6 is a sectional view of a configuration according to a second embodiment of the present invention.
Figure 7:
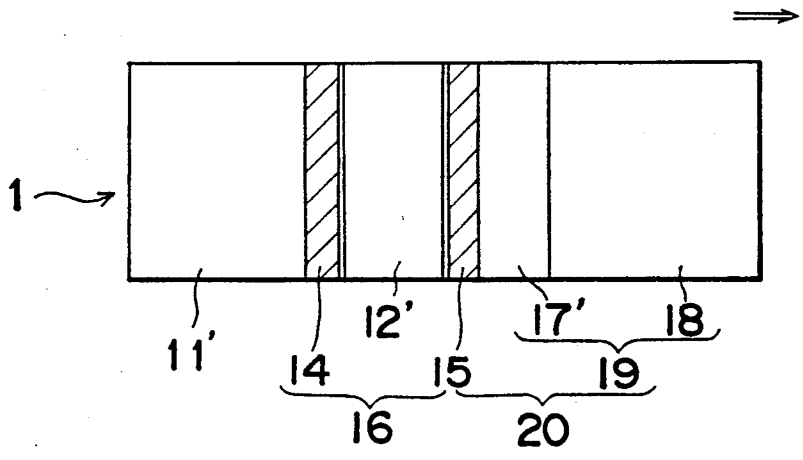
FIG. 7 is a sectional view of another electrode head used in the second embodiment of the present invention.

The electrode head shown in FIG. 6 is generally fabricated by a method in which the electrodes 14 and 15 are formed in a pattern on the insulating support members 12' and followed by holding the insulating support members 11' and 19 (preformed by fixing the support members 17' and 18 with an adhesive) held therebetween as a spacer and fixing by an inorganic adhesive. Then the head thus made is polished with a series of polishing paper No. 1000 to 8000 at the surface thereof. Numeral 19 may be an enamel layer such as a mica glaze formed on The Al base material 18. The head shown in FIG. 7 is constructed by laminating an electrode train 14 formed on the support 11' and on the other hand, printing a film electrode 15 of 40 microns on the enamel body 19 and then holding the support member 12 therebetween and fixing them.

(1) Electrode head: A6-size head 8 dots/mm in resolution (having a stylus electrode of Cr-Ni), configured of a support member 11' outside of the electrode pairs on the recording member insertion side, a support member 12' inside of the electrode pairs support member 17' contacting the electrode train on the recording member exit or feed-out side (which member are made of a high hard mica-glass) and a large thermal diffusion coefficient support member 18 of BN-AlN composite. The applied pulse width of 1 ms, the recording period of 4 ms/line and the pressure of 5 kg/100 mm. Both uniform-speed and relative-speed recordings are possible. (Relative speed ratio n=1 to 10)

Two types of heads have been test produced: One with the electrodes of all the electrode pairs having the same sectional area and the other with the electrode train on the recording member exit or feed-out side twice as large as that on the recording member insertion side.

(2) Resistive sheet: The alamide resin is mixed with carbon and is formed into a film having a thickness of 10 microns and a surface resistance of 1 k-ohms.

(3) Color material layer: Composed of solids including, by weight, one part of Indoaniline sublimable dye of cyane and one part of polycarbonate resin, formed into a film having a thickness of 2 microns.

(4)Image-receiving member: Composed of solids including, by weight, one part of polyester resin and 0.2 parts of silica, formed into a thickness of 8 microns on a 100-micron milky PET film.

A recording test conducted under the aforementioned conditions shows that an image is produced by a relative-speed process at a recording cycle of 2 ms/line and a recording energy of 3 $J/cm^2$ to be free of fog and obtain a long recording distance with a smooth gradation recording characteristic. The image thus recorded has a quality equivalent to the one obtained in the dye transfer recording process using a thermal head as a recording means. Also, an A6-size full-color image can be produced within about ten seconds by use of magenta and yellow in addition to the above-mentioned dye. The electrodes having a larger area on supply side are not corroded.

What is claimed is:

1. An electrode head for use in color transfer recording on a running recording member having a resistive ink sheet and an image receiving member for contacting a surface of the resistive ink sheet, the recording member running over the electrode head from an insertion side to an exit side, said electrode head comprising:

a plurality of spaced opposed electrodes spaced in a direction of running of the recording member and arranged in an electrode train extending transversely of the running direction;

an intermediate insulating support member between said spaced opposed electrodes in said electrode train and against which said electrodes are supported said intermediate insulating support has an abrasive wear resistance; and a first insulating support member having an abrasive wear resistance on the insertion side of said electrode head and a second insulating support member having an abrasive wear resistance on the exit side of said electrode head;

the abrasive wear resistance of said intermediate insulating support member being equal to or smaller than that of the first insulating support member and being equal to or greater than that of the second insulating support member.

2. An electrode head as claimed in claim 1 in which the electrodes of the electrode train which are toward said first insulating support member being directly mounted on said intermediate insulating support member and the electrodes in the electrode train which are toward the second insulating support member being directly mounted on said second insulating support member.

3. An electrode head as claimed in claim 1 in which the electrodes of the electrode train which are toward said first insulating support member are directly mounted on said first insulating support member, and the electrodes in the electrode train which are toward the second insulating support member are directly mounted on said second insulating support member.

4. An electrode head as claimed in claim 1 in which the electrodes of said electrode train are directly mounted on said intermediate insulating support member.

5. An electrode head as claimed in claim 1 in which the electrodes of the electrode train which are toward said first insulating support member are directly mounted on said first insulating support member, and the electrodes in the electrode train which are toward the second insulating support member are mounted directly on said intermediate insulating support member.

6. An electrode head as claimed in any one of claims 1-5 in which said first insulating support member and said intermediate insulating support member are made of glass material.

7. An electrode head as claimed in claim 6 in which the electrodes on one side of said electrode train are anode electrodes and the electrodes on another side are cathode electrodes, and a cross-sectional area of the electrodes on the anode side is greater than a cross-sectional area of the electrodes on the cathode side.

8. An electrode head as claimed in claim 6 in which said second insulating support member has a thermal diffusion coefficient of at least $1\times10^{-6}m^2s^{-1}$.

9. An electrode head as claimed in claim 6 in which said first and intermediate insulating support members has a thermal diffusion coefficient of no greater than $1 \times 10^{-6} m^2 s^{-1}$.

10. An electrode head as claimed in any one of claims 1-5 in which said second insulating support member is made of ceramic material.

11. An electrode head as claimed in claim 10 in which the electrodes on one side of said electrode train are anode electrodes and the electrodes on another side are cathode electrodes, and a cross-sectional area of the electrodes on the anode side is greater than a cross-sectional area of the electrodes on the cathode side.

12. An electrode head as claimed in claim 10 in which said second insulating support member has a thermal diffusion coefficient of at least $1 \times 10^{-6} m^2 s^{-6}$.

13. An electrode head as claimed in claim 10 in which said first and intermediate insulating support members has a thermal diffusion coefficient of no greater than $1 \times 10^{-6} m^2 s^{-1}$.

14. An electrode head as claimed in any one of claims 1-5 in which said second insulating support member has two parts, a first part which is toward said intermediate insulating support member and a second part being away from the intermediate insulating support member, said first part having a higher hardness than said second part.

15. An electrode head as claimed in claim 14 in which the electrodes on one side of said electrode train are anode electrodes and the electrodes on another side are cathode electrodes, and a cross-sectional area of the electrodes on the anode side is greater than a cross-sectional area of the electrodes on the cathode side.

16. An electrode head as claimed in claim 14 in which said second insulating support member has a thermal diffusion coefficient of at least $1 \times 10^{-6} m^2 s^{-1}$.

17. An electrode head as claimed in claim 14 in which said first and intermediate insulating support members has a thermal diffusion coefficient of no grater than $1 \times 10^{-6} m^2 s^{-1}$.

18. An electrode head as claimed in any one of claims 1-5 in which the electrodes on one side of said electrode train are anode electrodes and the electrodes on another side are cathode electrodes, and a cross-sectional area of the electrodes on the anode side is greater than a cross-sectional area of the electrodes on the cathode side.

19. An electrode head as claimed in claim 18 in which said second insulating support member has a thermal diffusion coefficient of at least $1 \times 10^{-6} m^2 s^{-1}$.

20. An electrode head as claimed in claim 18 in which said first and intermediate insulating support members has a thermal diffusion coefficient of no greater than $1 \times 10^{-6} m^2 s^{-1}$.

21. An electrode head as claimed in any one of claims 1-5 in which said second insulating support member has a thermal diffusion coefficient of at least $1 \times 10^{-6} m^2 s^{-1}$.

22. An electrode head as claimed in any one of claims 1-5 in which said first and intermediate insulating support members has a thermal diffusion coefficient of no greater than $1 \times 10^{-6} m^2 s^{-1}$.

23. An electrode head for use in color transfer recording on a running recording member having a resistive ink sheet and an image receiving member for contacting a surface of the resistive ink sheet, the recording member running over the electrode head from an insertion side to an exit side, said electrode head comprising:

a plurality of spaced opposed electrodes spaced in a direction of running of the recording member and arranged in an electrode train extending transversely of the running direction;

an intermediate insulating support member between said spaced opposed electrodes in said electrode train and against which said electrodes are supported; and a first insulating support member on the insertion side of said electrode head and a second insulating support member on the exit side of said electrode head;

said intermediate insulating support member is made of a glass material, and said second insulating support member is made of a material having a larger thermal diffusion coefficient than that of said glass material.

24. An electrode head for use in color transfer recording on a running recording member having a resistive ink sheet and an image receiving member for contacting a surface of the resistive ink sheet, the recording member running over the electrode head from an insertion side to an exit side, said electrode head comprising:

a plurality of spaced opposed electrodes spaced in a direction of running of the recording member and arranged in an electrode train extending transversely of the running direction;

an intermediate insulating support member between said spaced opposed electrodes in said electrode train and against which said electrodes are supported; and a first insulating support member on the insertion side of said electrode head and a second insulating support member on the exit side of said electrode head;

said second insulating support member having two parts, and the part toward said intermediate insulating support member being made of a glass material, and the part of said second insulating support member which is away from said intermediate insulating support member being made of a material having a larger thermal diffusion coefficient than that of said glass material.

25. An electrode head as claimed in claim 24 in which said part toward said intermediate insulating support member has a thickness of no more than 100 microns.

26. An electrode head as claimed in claim 24 in which said part toward said intermediate insulating support member is an enamel coating having a thickness of no more than 100 microns.

27. An electrode head as claimed in any one of claims 23-26 in which said glass material has a thermal diffusion coefficient of at least $1 \times 10^{-6} m^2 s^{-1}$.

28. An electrode head as claimed in claim 23 or 24 in which said large thermal diffusion coefficient material is ceramic or metal.

* * * * *